United States Patent
Beach et al.

(10) Patent No.: US 8,181,203 B2
(45) Date of Patent: *May 15, 2012

(54) DISTRIBUTED, INTERACTIVE TELEVISION PROGRAM GUIDE; SYSTEM AND METHOD

(75) Inventors: Brian Beach, Santa Cruz, CA (US); Alan Waterman, Los Gatos, CA (US)

(73) Assignee: TiVo Inc., Alviso, CA (US)

( * ) Notice: Subject to any disclaimer, the term of this patent is extended or adjusted under 35 U.S.C. 154(b) by 470 days.

This patent is subject to a terminal disclaimer.

(21) Appl. No.: 11/757,958

(22) Filed: Jun. 4, 2007

(65) Prior Publication Data

US 2007/0240187 A1    Oct. 11, 2007

Related U.S. Application Data

(63) Continuation of application No. 10/168,839, filed on Jun. 21, 2002, now Pat. No. 7,228,556.

(60) Provisional application No. 60/171,829, filed on Dec. 21, 1999.

(51) Int. Cl.
*G06F 3/00* (2006.01)
*G06F 13/00* (2006.01)
*H04N 5/445* (2006.01)

(52) U.S. Cl. .............. 725/53; 725/52; 725/142

(58) Field of Classification Search .......... 725/29, 725/52, 53; 707/3, 4, 6, 7, 102
See application file for complete search history.

(56) References Cited

U.S. PATENT DOCUMENTS 6,654,754 B1 * 11/2003 Knauft et al. ............... 1/1
6,742,184 B1 * 5/2004 Finseth et al. ............. 725/52
6,925,650 B1 * 8/2005 Arsenault et al. .......... 725/39

OTHER PUBLICATIONS

European Patent Office, "Communication Pursuant to Article 94(3) EPC", Application No. 00990325.3-1522, dated Mar. 31, 2008, 6 pages.
Claims, Application No. 00990325.3-1522, 10 pages.
Chinese Patent Office, Application Serial No. 200610067961.x, Communication dated Jul. 17, 2009.
Chinese Patent Office, Application Serial No. 200610067961.X, Current Claims as of Jul. 17, 2009.
Chinese Patent Office, Application Serial No. 200610067961.x, Communication dated May 22, 2009.
Chinese Patent Office, Application Serial No. 200610067961.X, Current Claims as of May 22, 2009.
European Patent Office, Application Serial No. 00990325.3-2202, Communication dated Apr. 23, 2009.
European Patent Office, Application Serial No. 00990325.3-2202, Current Claims as of Apr. 23, 2009, dated Apr. 23, 2009.

* cited by examiner

*Primary Examiner* — Ngoc Vu
(74) *Attorney, Agent, or Firm* — Hickman Palermo Truong Becker Bingham Wong LLP; Kirk D. Wong

(57) ABSTRACT

In an interactive network-based personal video recording system, a user interface is provided that allows viewers to search a database of program guide information according to program title, indexed program attributes such as actor and director, and key word. Viewer interaction is by way of a remote control unit.

16 Claims, 5 Drawing Sheets

DISTRIBUTED, INTERACTIVE TELEVISION PROGRAM GUIDE; SYSTEM AND METHOD

CLAIM OF PRIORITY AND RELATED APPLICATION

This application is a continuation of and claims benefit of U.S. patent application Ser. No. 10/168,839, filed Jun. 21, 2002 now U.S. Pat. No. 7,228,556, entitled "Distributed, Interactive Television Program Guide; System and Method", the entire contents of which are incorporated by reference as if fully set forth herein, U.S. patent application Ser. No. 10/168,839 claims priority to U.S. Provisional Patent Application Ser. No. 60/171,829, filed Dec. 21, 1999.

BACKGROUND OF THE INVENTION

1. Field of the Invention

The invention relates generally to a network-based video recording system. More particularly, the invention relates to a method and apparatus for searching a client-side database of program guide information to identify program items of interest.

2. Description of Related Art

The number of programming options available to television viewers is constantly increasing, with television programming now available from the major networks, cable channels, satellite, pay-per-view, community access television, and so on. Paralleling this growing availability of television programming is a decrease in the amount of leisure time viewers have for watching television; due to job demands, time spent commuting, family responsibilities and the like. Because of these severe schedule constraints, the complaint is pervasive among viewers that "There's nothing on" when they do have time for television viewing, in spite of the unprecedented availability of television entertainment. This complaint is more a result of the difficulty of matching one's own schedule to network television schedules than it is due to quality or availability of television programming. The ability provided by VCR's and other recording devices to make automatic, unattended recordings of television programs has freed viewers from the dictates of network scheduling.

However, the viewer is still faced with the time-consuming chore of examining schedules for literally hundreds of television channels to identify programs of interest. As a result, electronic program guides have been developed to help viewers deal with the mass of programming information. Typically, such guides are provided in cable and satellite television environments. The program information is presented in a grid format, organized by time slot and channel. The guide is displayed by scrolling across the screen. However, these guides are not interactive; they cannot be searched, nor can the viewer control the display of information in any way. The viewer must simply passively watch the information scroll by, hoping that something useful or interesting will pass by.

Searchable program guides are now available. For example, S. Schein, J. Leftwich, Method and apparatus for searching a guide using program characteristics, U.S. Pat. No. 6,133,909 (Oct. 17, 2000) describe a searchable program guide that allows a viewer to search according to program attributes such as actors or directors. The guide described by Schein, et al. eases the viewer's task of locating programs of interest. Unfortunately, the described guide only allows the user to search to search the guide according to indexed attributes, such as actor or director. However, indexed attributes often fail to anticipate a user's search behavior. Thus, Schein, et al. do not provide the user with any way to search outside of those indexed attributes.

From the foregoing, it is apparent that an interactive program guide that affords the viewer more flexible search options would be a significant technological advance.

SUMMARY OF THE INVENTION

The invention provides a method and apparatus for searching a database of program information in an interactive, network-based video recording system, in order to identify programs of interest. A viewer enters search terms using a virtual alphanumeric keypad displayed in a viewer interface by means of a remote control. The viewer may search according to program title, indexed attributes such as category, actor, and director; or a key word search allows the viewer to search by program content or subject matter. A prefix matching capability provides a type-ahead feature, so that search terms may be rapidly located in the appropriate index simply by entering one or more of the leading characters of the search term.

DETAILED DESCRIPTION

Figure 1:
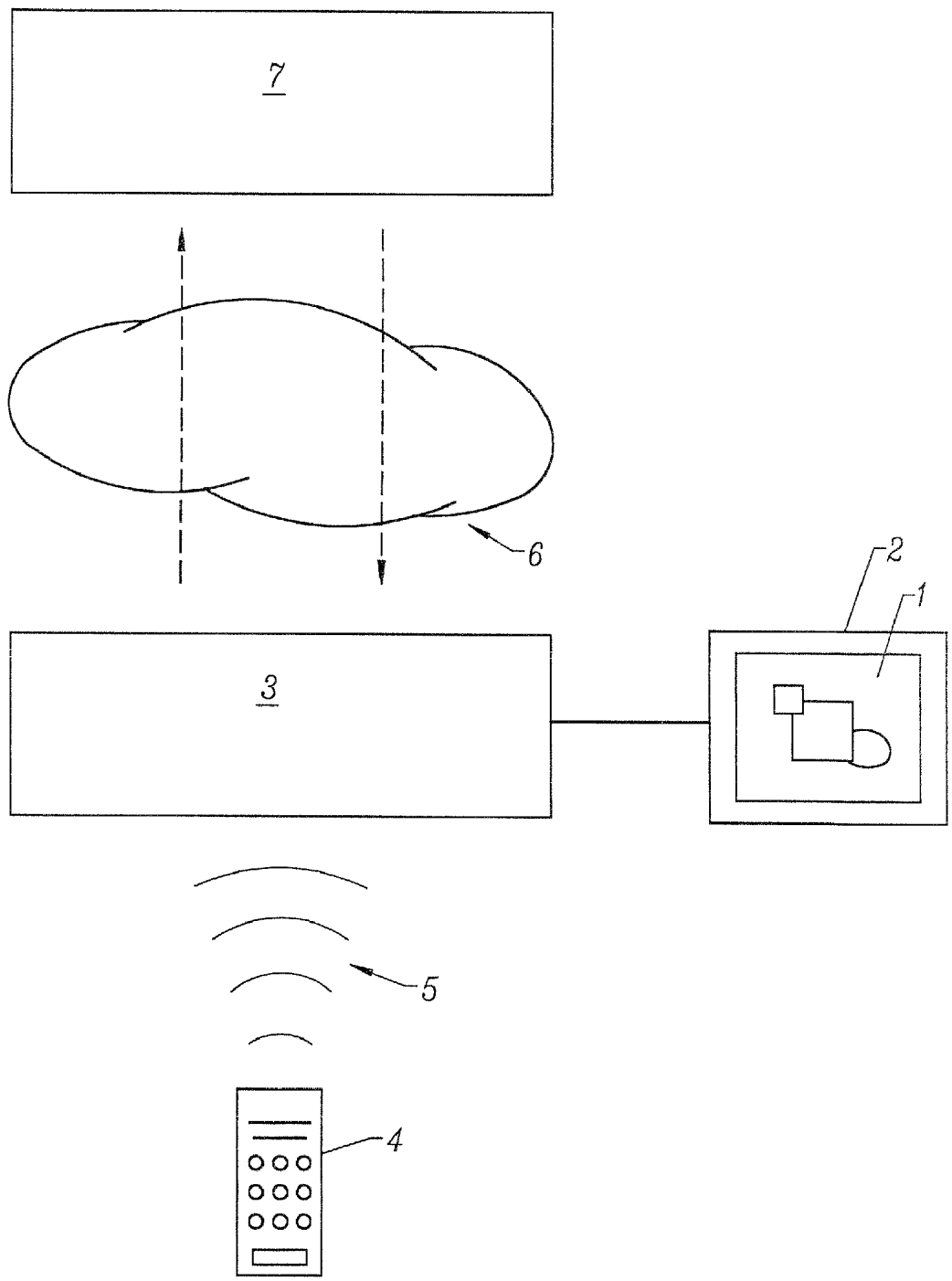
FIG. 1 shows a block diagram of an interactive, network-based video recording system, according to the invention.

In an interactive, network-based video recording system, a searchable program guide is provided to facilitate the task of identifying programs of interest by the viewer. As shown in FIG. 1, a viewer interface 1 to a client unit 3 provides a series of interactive screens that incorporate interface elements such as text boxes, searchable lists, selection bars, and alphanumeric keypads. The viewer navigates the interface and generally interacts with the system by means of a hand-held remote control 4 that communicates with the client unit by means of a data signal 5. In the preferred embodiment, the data signal is embedded in an IR carrier signal, but other carrier signals known to those skilled in the art of wireless data transfer would also be suitable. Typically, the interface is displayed on the screen of a television set 2 connected to the client unit. However, other display means would also be suitable. The client unit is in periodic contact 6 (the arrows denoting the network connection are dashed to indicate the intermittent nature of the connection) with a server 7, during which time, current program information, originating from a vendor, is downloaded to the client unit. After downloading, the program information is imported into a database application resident on a fixed storage medium such as a disk drive. The current embodiment of the invention employs an object-oriented database application, but other types of database applications, such as relational databases, would also be suitable.

Figure 2:
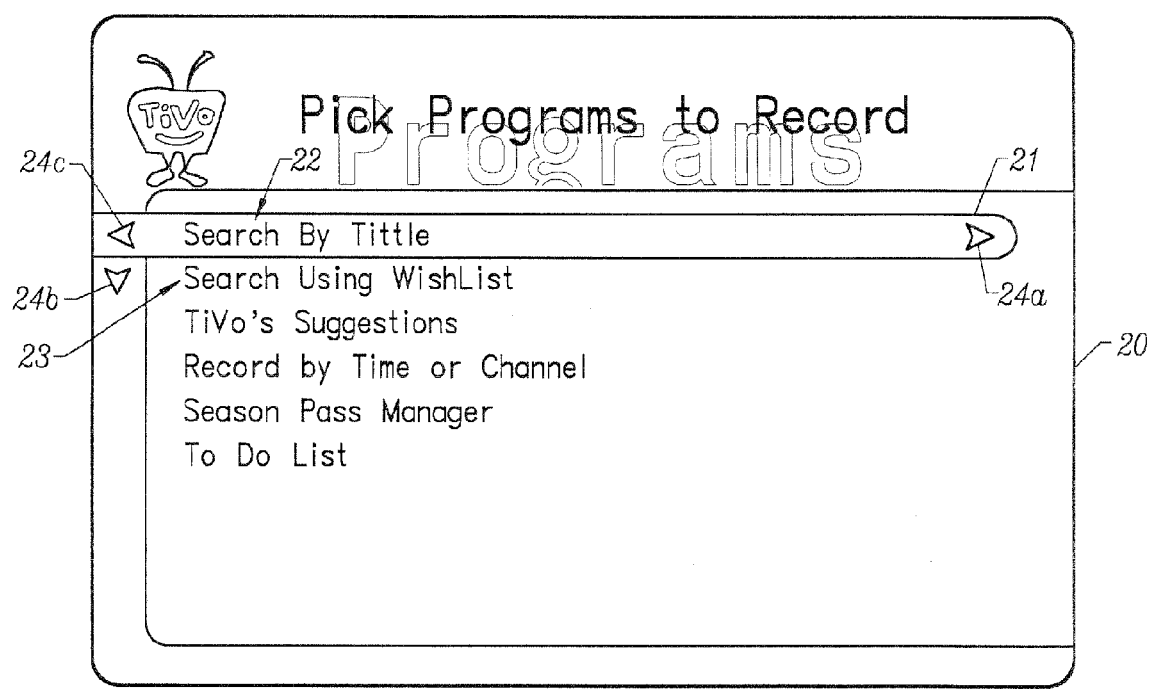
FIG. 2 shows a top-level screen of a viewer interface for searching an interactive program guide, according to the invention.

Referring now to FIG. 2, shown is a top-level screen 20 to the search interface. A selection bar 21 highlights the various search options available. The first option 22, allows the viewer to search the program guide according to program title. A second option 23, allows the user to create search profiles that search according to actor name, director name, category and key word. In addition, other search options are possible. For example, expanded search functionality may include indices for year of release, language, choreographer, or any other program attribute that could be indexed. Navigating arrows 24 advise the viewer of the navigation options available. For example, in FIG. 2, a 'right' arrow 24a navigates the viewer to a screen (FIG. 3) for searching by title; a 'down' arrow 24b allows the viewer to scroll through the list of provided options; and a 'left' arrow 24c navigates the viewer back to the previous screen. If the selection bar were positioned farther down in the list of options, an 'up' arrow (not shown) would permit the viewer to scroll up the list. The 'up,' 'down,' 'right' and 'left' arrows are operated by pressing corresponding buttons on the handheld remote control 4. In the example of FIG. 2, the viewer selects 'Search by title' 22.

Figure 3:
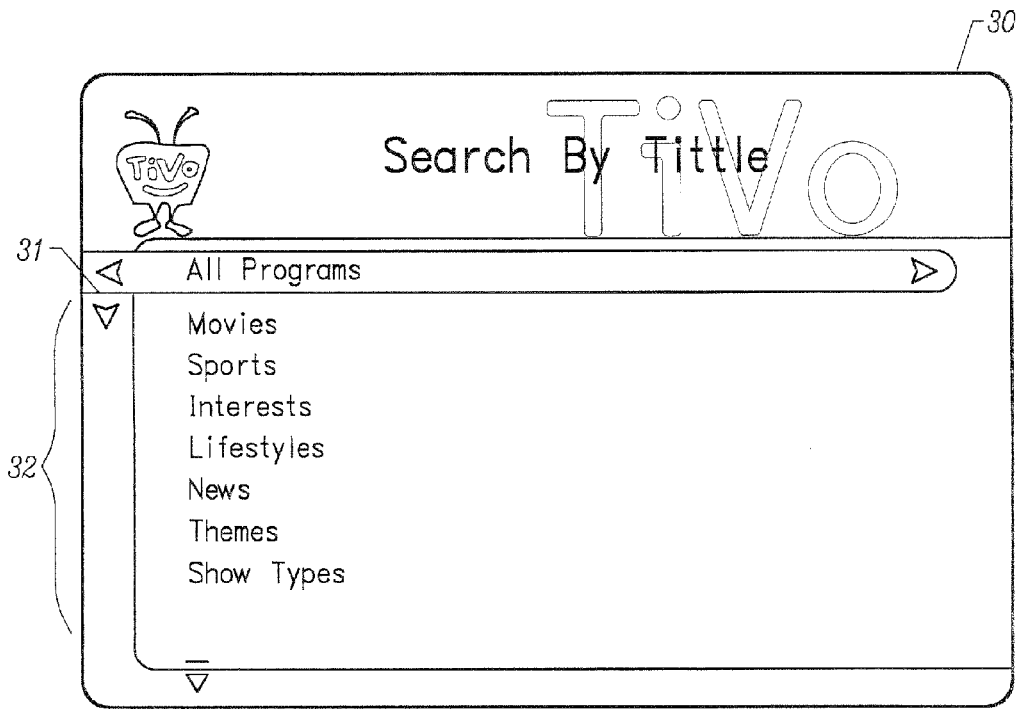
FIG. 3 shows a screen from the viewer interface of FIG. 2 for searching by title, according to the invention.

Referring now to FIG. 3, a screen 30 is shown that gives the viewer the option of narrowing a title search according to program category, or not, according to the viewer's need or desire. By selecting the 'all programs' option, the search is performed in the entire program database. Selecting a category 32, limits the search to programs defined by the corresponding category descriptor. Limiting a search by category would be most useful when the viewer is browsing for a program of particular type. If the viewer desired to maximize retrieval, or if they were searching for a specific program for which they knew at least a portion of the title, limiting by program category might be less useful.

Figure 4:
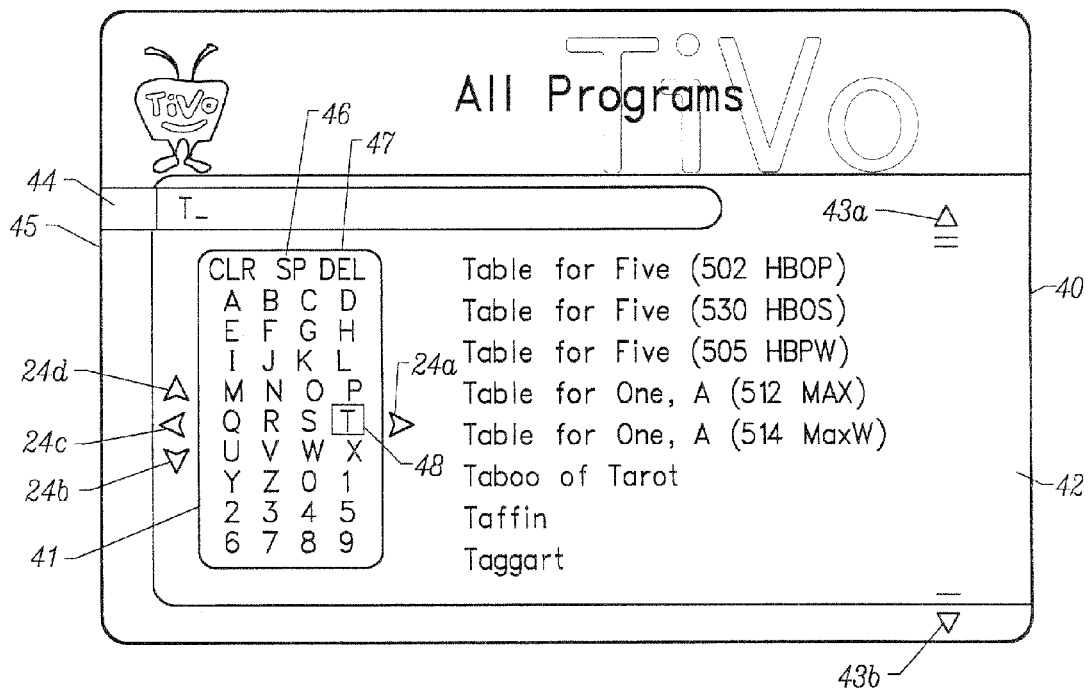
FIG. 4 shows an alphanumeric keypad for searching by title, according to the invention.

After choosing a category, the user is navigated to a screen as shown in FIG. 4. Shown is a screen 40 displaying a virtual alphanumeric keyboard 41 and a text box 44. The viewer uses the navigation controls (not shown) on the remote control to position a selection marquee 48 around the character of choice. When the selection marquee is properly positioned at the desired character, the viewer presses a 'select' button, upon which the selected character appears in the text box 44. The viewer continues selecting characters, until they have entered at least a portion of the program title in the text box. 'Clear,' 'space' and 'delete' functions 45, 46 and 47, respectively, are provided for clearing the box, inserting a space between words, and deleting single characters. Prefix matching gives the screen a type-ahead capability. Thus, as the viewer enters characters, the title list 42 automatically scrolls to the program items having prefixes that match the character string entered by the viewer. As described previously, the directional arrows 24a-d advise the user of the navigation options available to them. As shown in FIG. 4, the selection marquee is positioned around the character 'T' in the rightmost column of the keypad 41. In this case, navigating to the right would cause focus to shift from the keypad to the title list 42. 'Up' and 'down' arrows 43a and b indicate that the viewer may scroll up or down in the title list.

Figure 5:
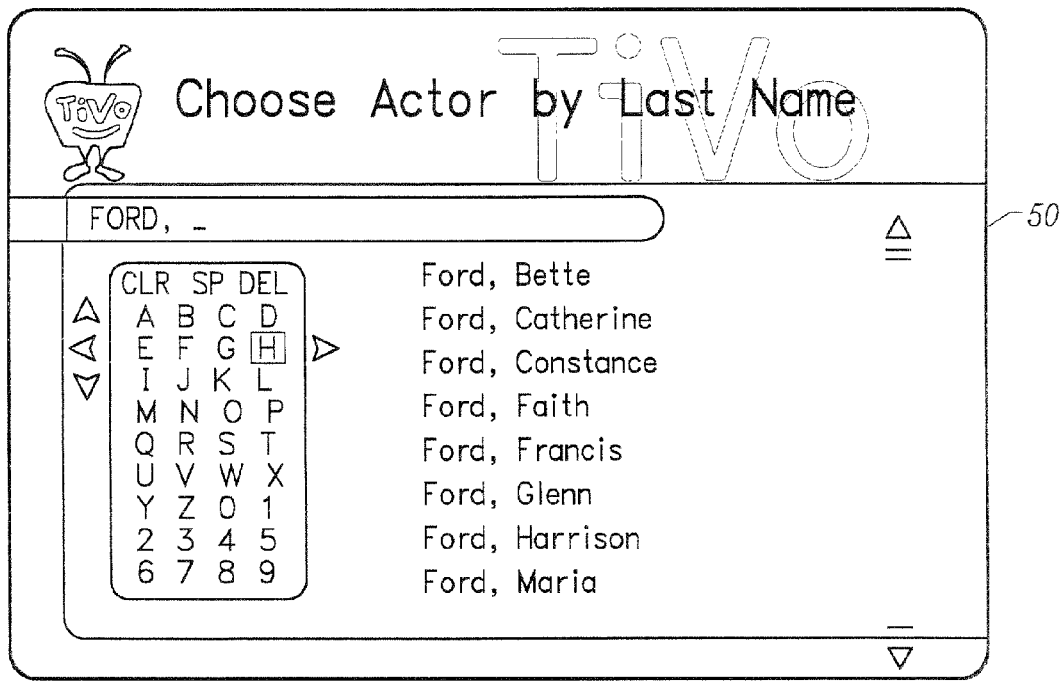
FIG. 5 shows an alphanumeric keypad for searching by actor name, according to the invention.
Figure 6:
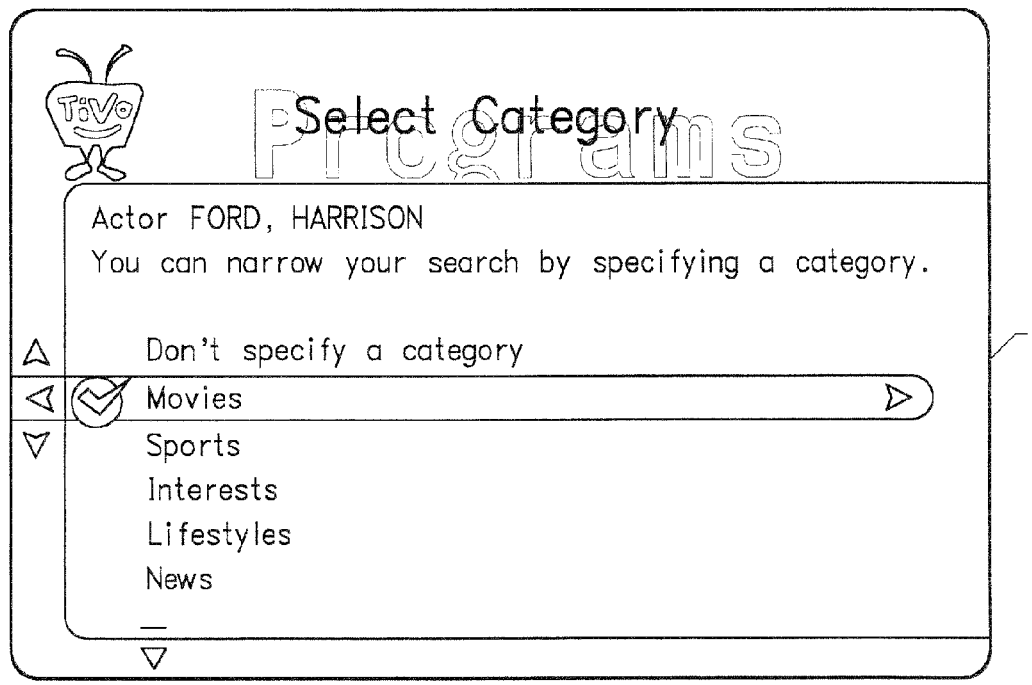
FIG. 6 shows a category list for narrowing an actor name search, according to the invention.

As described above, the viewer may create search profiles in which they search according to indexed program attributes or keywords. Program attributes may include actor name, director name, category, choreographer, language, year of release, and the like. FIG. 5 shows a screen 50 for searching according to actor name. It should be noted that searching according to indexed attributes or key word requires the creation of a search profile. When the search profile is created, it may be saved and named. Interaction with the search screen 50 is analogous to that previously described for the title entry screen, thus it will not be further described. As FIG. 6 shows, following entry of an actor name, a screen 60 allows the user to narrow a search according to category, if desired. Another set of screens (not shown) is provided for searching according to director name. Their appearance and function is analogous to those for searching according to actor name, thus they will not be further described.

Figure 7:
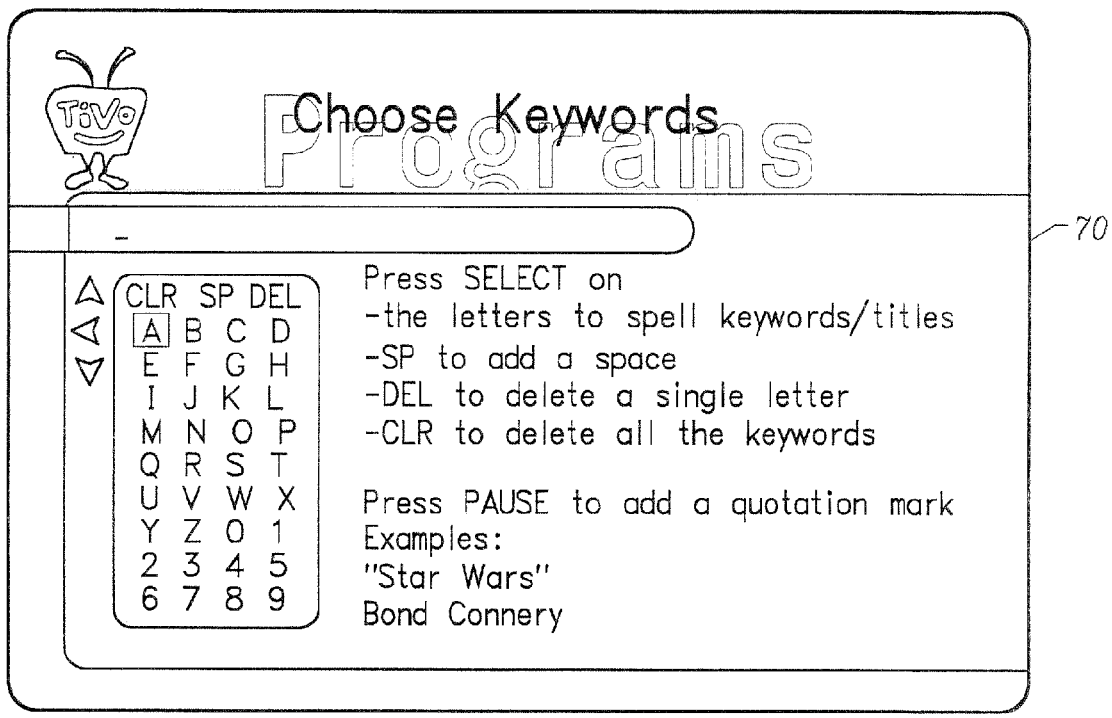
FIG. 7 shows an alphanumeric keypad for searching by keyword, according to the invention.
Figure 8:
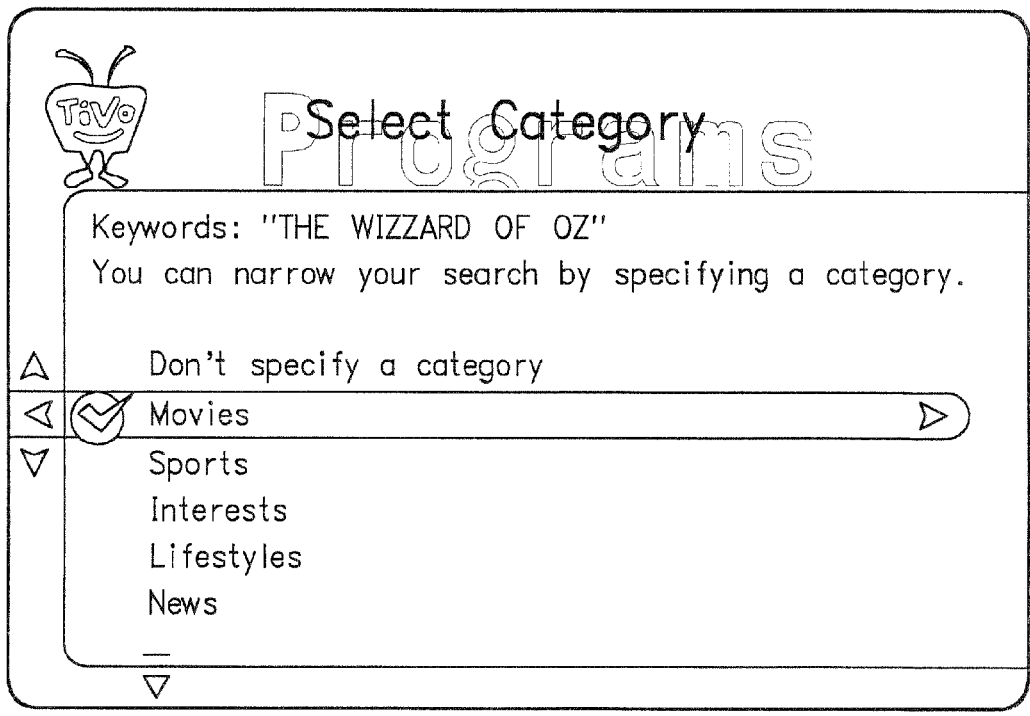
FIG. 8 shows a category list for narrowing a keyword search, according to the invention.

FIGS. 7 and 8 show screens 70 and 80 for searching according to key word and narrowing according to category, respectively. As previously described, keyword searching requires the creation of a search profile. As will be described below, key words are extracted from actor and director names, titles and a narrative program description.

The key word search feature is highly advantageous in that it provides an important additional access point not found in conventional program guides. It is a well-known problem to those skilled in the design of publicly accessible information retrieval systems that it is impossible to anticipate a user's search behavior with complete certainty. Thus, no matter how skillfully indexed an information base may be, it will be unable to accommodate the information-seeking behavior of all users. Therefore, to provide a system that delivers maximum serviceability to its constituency, it is highly desirable to provide as many different access points as possible. By including a key word search feature, the current invention provides an important, highly flexible means of accessing program content and subject matter outside of the indexed attributes.

The method of interacting with the key word search screens is exactly analogous to the screens previously described. Thus, they will not be further described.

Indexing

As previously noted, the video recording system of the present invention is network-based, consisting of a central server, and a plurality of client units, each client being in periodic communication with the server. In the preferred embodiment of the invention, the network connection is a dial-up connection over a publicly available telecommunication network. However, other network connections, a wireless connection, for example, would be equally suitable. In the preferred embodiment of the invention, the client is in communication with the server for a brief period on a daily basis. During the daily connection period, the client downloads current program guide data. The downloaded program information is imported into an object-oriented database resident on the client. As previously indicated, when a viewer searches the database to find programs of interest, they may search by program name, by indexed attributes such as actor name or director name; and by keyword. A direct, sequential search of the records in the database objects would be prohibitively time-consuming and would waste system resources, unfavorably affecting the usability of the program guide. Thus, the database is indexed, and searches are conducted on the provided index files, greatly improving search efficiency.

While the database may include other objects, the title search feature is concerned primarily with the 'Series' object. The attribute search and key word search features are concerned primarily with the 'Program' object. The 'Series' object includes a record for each television series. For the title search, the most important field of the 'Series' object is the series 'Title' field.

The attribute search and the key word search are concerned primarily with the 'Program' object. The 'Program' object includes a record for each individual program item, where an individual program item might be a single episode of a series, for example. The 'Program' object includes at least the following fields:
Title;
Episode title;
Description;
Actors
Hosts;
Guest stars; and
Directors.

The above list is not intended to be limiting. Other record configurations consistent with the spirit and scope of the invention are possible. Information is extracted from the individual records and assembled into a series of index files. For the title search feature, a 'Title' index is constructed. For the attribute search feature, 'Actor' and 'Director' indices are built. Finally, for the key word search, a 'Key word' index and a 'Title word' index are provided.

Generally, the process of indexing the database includes the following steps:
Extracting index terms from the database records;
Constructing intermediate files from the extracted index terms;
Creating raw, unsorted index files from the intermediate files;
Sorting the raw index files; and
Compressing the sorted files to form final index files.

The several steps of the indexing process are described in greater detail below.

For the 'Title' index, the entire series title is extracted as a text string from the 'Title' field of each 'Series' record, with each text string constituting a separate index term, or key.

For the 'Actor' index, each name is extracted from the 'Actors,' 'Hosts' and 'Guest stars' fields of the 'Program' records, with each name from each record constituting a separate actor key. Similarly, for the 'Director' index, each name is extracted from the 'Directors' field, with each name from each record constituting a separate director key.

For the 'Title word' index, each separate word, having a length of at least two characters, of each title from both the 'Title' and 'Episode title' fields is extracted, with each separate word constituting a separate title word. For the 'Key word' index, each separate word having a length of at least two characters is extracted from the 'Description' field, with each occurrence of each word constituting a separate key word.

Following key extraction, the keys are assembled into intermediate files: one for each of 'Ttitle,' 'Actor,' 'Director,' 'Title word' and 'Key word'. The 'Title' intermediate file includes the 'Title' keys, the 'Actor' intermediate file includes the 'Actor,' 'Host' and 'Guest star' keys, and the 'Director' intermediate file includes the 'Director' keys, with the names in the 'Actor' and 'Director' keys listed directory style: last name and first name, separated by a comma. The 'Title word' file includes the title words extracted form the 'Title' and 'Episode title' fields of the 'Program' object. The 'Key word' file, however, is constructed differently from the previous intermediate files. Each key word forms a separate entry in the 'Key word' file. Additionally, actor names are incorporated into the 'Key word' index. The actor names are parsed into separate first and last names, and then added to the 'Key word' intermediate file. Thus the 'Key word' file includes the words from the,' 'Description' field and the name words from the 'Actors,' 'Hosts' and 'Guest stars' fields. The end result of this step is an intermediate file for each of 'Title,' 'Actor,' 'Director,' Title word' and 'Key word,' each comprising a simple listing of the respective keys or index terms, in a text file.

The intermediate files are subsequently used to build raw, unsorted index files. Each key of the intermediate files described above is paired with a program identifier that corresponds to the record that the key originated from. The program identifier is a system-generated, alphanumeric identifier, distinct from the program identifiers assigned by commercial programming information vendors such as TRIBUNE MEDIA SERVICES. The raw index files take the form of delimited text files; however other data structures, such as tables, would be equally suitable. In the preferred embodiment of the invention, the files are formatted as follows:

<KEY> <TAB> <PROG ID>
.
.
.
.
<KEY> <TAB> <PROG ID>.

As will be described further below, a binary search algorithm is employed to search the indices, requiring that the index be sorted. Thus, the raw index files are sorted on the keys.

The sorted index files are subsequently compressed by eliminating redundant keys, so that each distinct key is paired with a list of the program identifiers corresponding to each occurrence of the key in the database. In the preferred embodiment of the invention, the compressed index files are also delimited text files, formatted as follows:

| CAT | <TAB> <$ID_1, ID_2, ..., ID_N$> |
|---|---|
| LASER | <TAB> <$ID_1, ID_2, ..., ID_N$> |
| STAR | <TAB> <$ID_1, ID_2, ..., ID_N$> |
| TREK | <TAB> <$ID_1, ID_2, ..., ID_N$>, |

Where 'cat,' 'laser,' 'star' and 'trek' might be title words or key words and '$ID_1, ID_2, \ldots, ID_N$' is a list of program identifiers for each unique key.

Search Algorithm

A search engine employing a binary search algorithm is used to search the various indices. In general, the binary algorithm begins with an interval covering the whole search space. The search space is repeatedly divided in half according to how the search value compares with the middle element. If the search value is less than the item in the middle of the interval, the interval is narrowed to the lower half; otherwise it is narrowed to the other half. The operation is performed until the search value is found or the interval is empty.

As described above, the key word search includes title words. Therefore, during a key word search, a binary search of both the 'Keyword' index and the 'Title word' index is performed.

Although the invention has been described herein with reference to certain preferred embodiments, one skilled in the art will readily appreciate that other applications may be substituted without departing from the spirit and scope of the present invention. Accordingly, the invention should only be limited by the Claims included below.

What is claimed is:

1. A system for an interactive television program guide database, comprising:
   a plurality of clients, each client in the plurality of clients is in periodic communication with at least one server;
   a subsystem for periodically receiving, at a client, program guide information from the at least one server;
   a subsystem, at the client, that for each periodically received program guide information:
      extracts text from fields in the program guide information;
      processes the extracted text to create keys, each created key is associated with a program identifier;
      sorts the created keys;
      eliminates redundant keys from the created keys to create a set of unique keys so that each unique key is paired with a list of program identifiers corresponding to each occurrence of the unique key in the created keys before the elimination of redundant keys; and
      sorts the unique keys;
   a viewer interface on the client that accepts viewer alphanumeric input; and
   a subsystem, at the client, for searching the program guide information by comparing the unique keys to a viewer's alphanumeric input.

2. The system of claim 1, further comprising:
   a subsystem for grouping the unique keys according to specific indexes;
   wherein each index is associated with a group of the unique keys; and
   wherein a viewer selects an index and the searching subsystem performs a search on the group of the unique keys associated with the selected index.

3. The system of claim 2, wherein the searching subsystem incorporates a prefix matching feature that matches the viewer's alphanumeric input with the group of the unique keys associated with the selected index as the viewer enters the alphanumeric input and displays a list of program information by referring to the at least one program identifier associated with each matched unique key and extracting program information from the program guide information for display to the viewer.

4. The system of claim 3, wherein the viewer selects programs for the client to record from the displayed list of program information.

5. The system of claim 1, wherein the searching subsystem incorporates a prefix matching feature that matches the viewer's alphanumeric input with the unique keys as the viewer enters the alphanumeric input and displays a list of program information by referring to the at least one program identifier associated with each matched unique key and extracting program information from the program guide information for display to the viewer.

6. The system of claim 5, wherein the viewer selects programs for the client to record from the displayed list of program information.

7. The system of claim 1, wherein the searching subsystem further comprises a screen for entering a program title and displaying a list of program titles, the screen for entering a program title and displaying a list of program titles comprising:
   a virtual alphanumeric keypad for entering alphanumeric characters to spell a program title;
   a text box for displaying the entered alphanumeric characters; and
   a scrollable list of program titles, wherein the prefix matching feature causes the list of program titles to automatically scroll to titles in the list having prefixes that match an alphanumeric string displayed in the text box.

8. The system of claim 7, wherein the viewer enters alphanumeric characters by activating controls on a remote control that correspond to virtual controls on the virtual alphanumeric keypad.

9. A method for an interactive television program guide database, comprising:
   periodically receiving, at a client from among a plurality of clients, program guide information from the at least one server;
   wherein each client in the plurality of clients is in periodic communication with at least one server;
   for each periodically received program guide information, the client:
      extracting text from fields in the program guide information;
      processing the extracted text to create keys, each created key is associated with a program identifier;
      sorting the created keys;
      eliminating redundant keys from the created keys to create a set of unique keys so that each unique key is paired with a list of program identifiers corresponding to each occurrence of the unique key in the created keys before the elimination of redundant keys; and
      sorting the unique keys;
   accepting viewer alphanumeric input via a viewer interface on the client; and
   searching, by the client, the program guide information by comparing the unique keys to a viewer's alphanumeric input.

10. The method of claim 9, further comprising:
    grouping the unique keys according to specific indexes;
    wherein each index is associated with a group of the unique keys; and
    wherein a viewer selects an index and the searching step performs a search on the group of the unique keys associated with the selected index.

11. The method of claim 10, wherein the searching step incorporates a prefix matching feature that matches the viewer's alphanumeric input with the group of the unique keys associated with the selected index as the viewer enters the alphanumeric input and displays a list of program information by referring to the at least one program identifier associated with each matched unique key and extracting program information from the program guide information for display to the viewer.

12. The method of claim 11, wherein the viewer selects programs for the client to record from the displayed list of program information.

13. The method of claim 9, wherein the searching step incorporates a prefix matching feature that matches the viewer's alphanumeric input with the unique keys as the viewer enters the alphanumeric input and displays a list of program information by referring to the at least one program identifier associated with each matched unique key and extracting program information from the program guide information for display to the viewer.

14. The method of claim 13, wherein the viewer selects programs for the client to record from the displayed list of program information.

15. The method of claim 9, wherein the searching step further comprises a screen for entering a program title and displaying a list of program titles, and further comprises:
    accepting viewer input of alphanumeric characters to spell a program title on a virtual alphanumeric keypad;

displaying the entered alphanumeric characters in a text box; and wherein the prefix matching feature causes a list of program titles to automatically scroll to titles in the list having prefixes that match an alphanumeric string displayed in the text box.

16. The method of claim 15, wherein the viewer enters alphanumeric characters by activating controls on a remote control that correspond to virtual controls on the virtual alphanumeric keypad.

* * * * *